May 30, 1967 P. BREIDT, JR., ET AL 3,321,804
EXTRUSION OF WIDE THERMOPLASTIC FILM AND SHEET
Original Filed Oct. 14, 1964 2 Sheets-Sheet 1

INVENTORS.
Peter Breidt, Jr.
Lloyd E. Lefevre
BY

AGENT

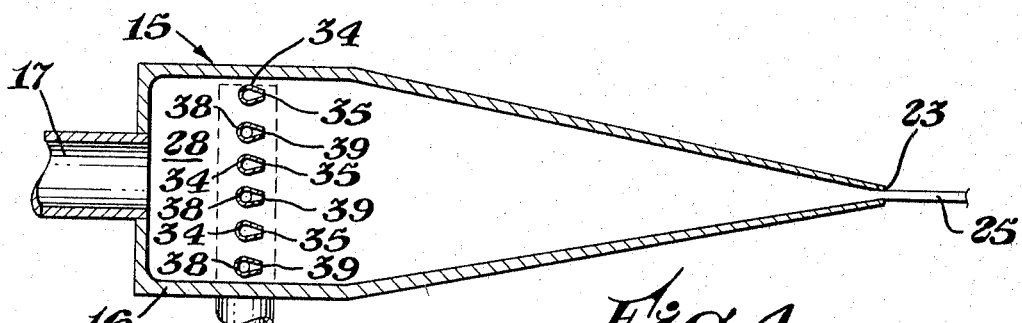
Fig. 4
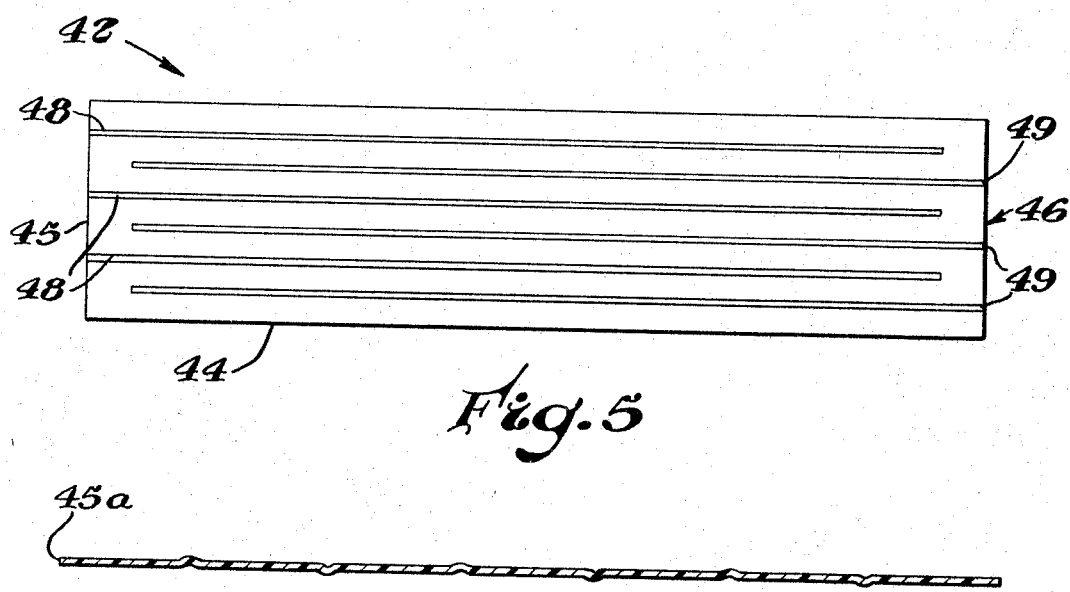
Fig. 5
Fig. 6
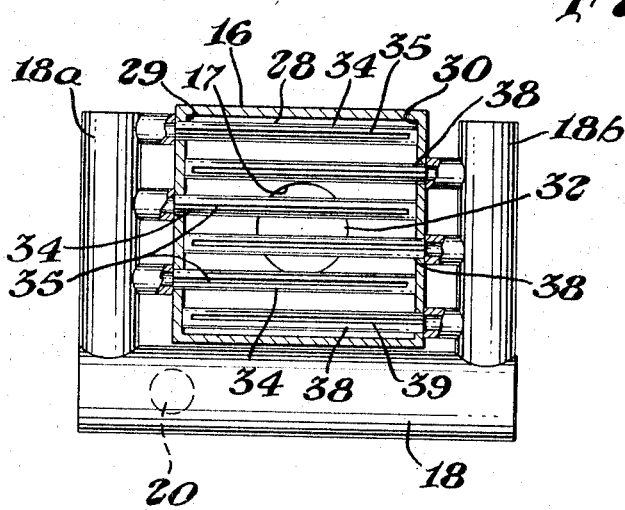
Fig. 3
INVENTORS.
Peter Breidt, Jr.
Lloyd E. Lefevre
BY
Robert Bringham
AGENT

United States Patent Office 3,321,804
Patented May 30, 1967

3,321,804
EXTRUSION OF WIDE THERMOPLASTIC FILM AND SHEET
Peter Breidt, Jr., Midland, and Lloyd E. Lefevre, Bay City, Mich., assignors to The Dow Chemical Company, Midland, Mich., a corporation of Delaware
Original application Oct. 14, 1964, Ser. No. 403,713. Divided and this application Mar. 24, 1966, Ser. No. 571,656
2 Claims. (Cl. 18—13)

This application is a divisional application of our copending application Ser. No. 403,713, filed Oct. 14, 1964.

This invention relates to the extrusion of wide thermoplastic resinous sheet. It more particularly relates to an apparatus for the preparation of wide sheet.

For many application wide thermoplastic resinous sheet is desired. It is obtained by one of two methods. One method is by extruding such material in equipment having a die sufficiently large to generate a sheet of the desired width and a second method is the extrusion of a tube and stretching of the tube by means of internal gas pressure by the well known bubble process and subsequently slitting the tube to provide a sheet having a width equal to the circumference of the tube. Generally equipment for the preparation of such wide sheets is very expensive, complicated, and occupies much space.

It is an object of this invention to provide an improved method and apparatus for the preparation of thermoplastic resinous sheets of relatively great width.

Another object of the invention is to provide an apparatus which would permit the extrusion of wide thermoplastic resinous sheet in a space which has a maximum dimension substantially less than the sheet being prepared.

These objects and other benefits and advantages of the present invention are achieved by the method of the present invention which comprises extruding a first stream of thermoplastic resinous material, the first stream having a first edge and a second edge, simultaneously extruding a plurality of minor streams within the first stream, each of the minor streams having a sheet-like configuration and being interdigitated with each other and alternatingly extending within the first stream from the first edge to a position adjacent the second edge and from the second edge to a position adjacent the first edge, the combined streams being formed into a generally sheet-like configuration and subsequently cooling below the thermoplastic temperature, the thermoplastic resinous material of the first stream being flexible and on cooling does not adhere strongly to the material of the minor streams.

The method of the invention is particularly adapted to be practiced by the apparatus of the invention which comprises an extrusion die comprising a housing, the housing having a first or main passageway so constructed and arranged so as to permit streamline flow therein, the housing defining a first polymer entrance and an oppositely disposed slot-like extrusion orifice, means disposed within the passageway defining a plurality of generally parallel slot-like extrusion orifices, each extrusion orifice adapted to deliver a sheet-like stream of material into a material flowing within the first passageway, the extrusion orifices alternately extending from opposite walls of the passageway for a distance somewhat less than the total width of the passageway and the orifices being in interdigitating relationship.

The sheet in accordance with the present invention comprises a flexible thermoplastic resinous sheet having disposed therein a plurality of poorly adhering lamina, the sheet having a first edge and a second edge, alternate lamina extending from the first edge toward the second edge, the remaining lamina extending from the second edge toward the first edge, the lamina being in generally parallel relationship and being interdigitated with each other.

Further features and advantages of the invention will become more apparent from the following specification when taken in connection with the drawing wherein:

FIGURE 1 schematically depicts the external configuration of an apparatus in accordance with the invention;

FIGURES 2, 3 and 4 are views of the apparatus of FIGURE 1;

FIGURE 5 is a schematic representation of a laminated sheet produced by the apparatus of FIGURES 1–4;

FIGURE 6 depicts a wide thermoplastic resinous flexible sheet prepared by the present invention.

Figure 1:
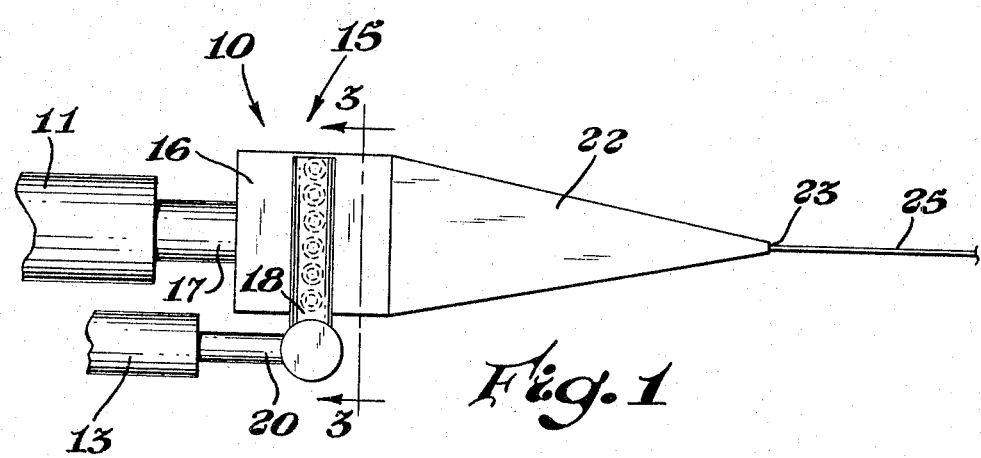

In FIGURE 1 there is schematically illustrated a view of apparatus in accordance with the invention generally designated by the reference numeral 10. The apparatus 10 comprises in cooperative combination a first extruder 11, a second extruder 13, and a die assembly 15. The die assembly 15 comprises a housing 16, a conduit 17 adapted to receive heat plastified thermoplastic resinous material from the extruder 11 and transfer it to the body 16, a distribution manifold 18, a conduit 20 adapted to receive material from the extruder 13 and deliver it to the manifold 18. The housing 16 has a transition section 22 which terminates in an extrusion slot 23 from which issues a sheet 25. The internal configuration of the housing 16 and transistion section 22 is such that streamline flow is permitted within.

Figure 2:
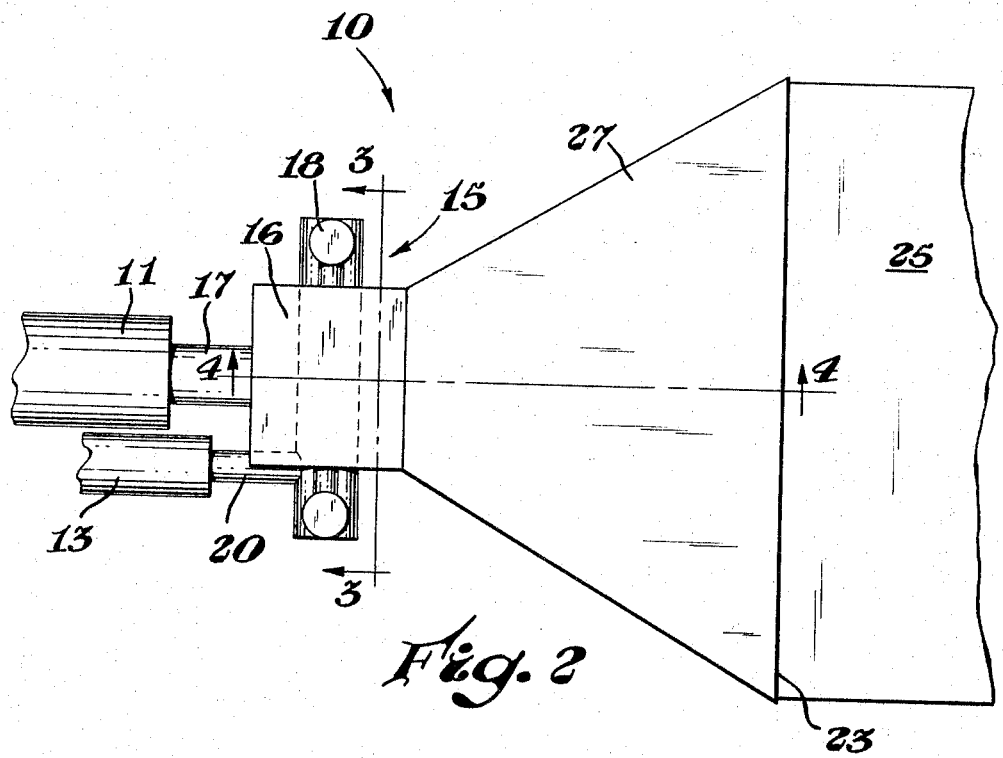

FIGURE 3 is a sectional view of the housing 16 taken along the line 3—3 of FIGURE 1 and 2. The housing 16 defines an internal major passageway 28 having oppositely disposed sides or edges 29 and 30. The passageway 28 is so constructed and arranged so as to permit substantially streamline flow therein. The conduit 17 defines a passageway 32 which is in operative communication with the extruder 11 (not shown). A plurality of housings 34 each defining an extrusion orifice 35 are disposed within the passageway 28. The housings 34 are in communication with a leg 18a of the distribution manifold 18. Extrusion orifices 35 extend from the wall 29 and terminate adjacent the wall 30, thus providing an orifice or slot extending from one wall to a location close to the opposite wall. A plurality of housings 38 are interdigitated with the housings 34. Each of the housings 38 defines an extrusion orifice or slot 39. The slots 39 extend from the wall 30 to a position generally adjacent and spaced from the wall 29. Thus the slots 35 and 39 alternately extend from opposite walls in an interdigitated manner.

FIGURE 4 is a view of the apparatus of FIGURES 1 and 2 taken along the line 4—4 of FIGURE 2 illustrating the generally parallel arrangements of the housings 34 and 38 within the passageway 28. Thermoplastic resinous material passing into the passage 28 from the conduit 17 flows about the housings 34 and 35. Material forced into the housings 34 and 35 is distributed within the stream in the passageway 28 in a manner as is illustrated by the end view configuration of the resultant sheet shown in exaggarated form in FIGURE 5. The schematic representation of FIGURE 5 depicts a sheet designated by the reference numeral 42. The sheet 42 comprises a flexible thermoplastic resinous body 44 having a first edge 45 and a second edge 46. Within the body 44 are a plurality of lamina 48 and a plurality of lamina 49. The lamina 48 extend from the edge 45 toward the edge 46 in generally parallel relationship, whereas the lamina 49 extend from the edge 46 toward the edge 45. The laminae 48 and 49 are generally parallel and are in interdigitated relationship. The laminae 48 and 49 are of a diverse material which is poorly adhered to the flexible thermoplastic resinous material 44.

FIGURE 6 is a sectional view of a wide sheet of thermoplastic resinous material prepared from the sheet 44 wherein a portion of the edge 45 designated as 45a has been separated from the adjacent lamina 48 and the entire body 44 stretched out to its maximum width.

Employing an apparatus substantially as illustrated in FIGURES 1, 2, 3, 4 and 5, high pressure polyethylene having a melt index of 10 is co-extruded with polystyrene. A 10 percent by weight of the polystyrene has a viscosity of about 20 centipoises at 25° C. The polyethylene is employed as the continuous phase, whereas the polystyrene is the interdigitated discontinuous phase. The resultant sheet is 28″ in width, and has a total thickness of 34 mils. The polyethylene layers have a thickness of 4 mils, and the polystyrene layers a thickness of about 1 mil. On cooling of the sheet to room temperature, the polyethylene and polystyrene layers are readily separated to form a sheet substantially as illustrated in FIGURE 6, having a thickness of about 4 mils, and a width of about 194½″. Repeating the previous procedure with the exception that a plasticized polyvinyl chloride is employed to replace the polyethylene, a wide polyvinyl chloride sheet is obtained, having a width of about 194½″, a thickness of 4 mils. Similar results are obtained when the polystyrene of the foregoing illustrations was replaced with polymethyl methacrylate, or ethyl cellulose.

The apparatus of the invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for the extrusion of a composite thermoplastic resinous sheet comprising in cooperative operative combination
    an extrusion die, the extrusion die comprising a housing, the housing having first passageway so constructed and arranged so as to permit streamline flow therein, the housing defining
    a first polymer entrance, and an oppositely disposed slot-like major extrusion orifice,
    means distributed within the passageway defining
    a plurality of generally slot-like minor extrusion orifices, each minor extrusion orifice adapted to deliver a sheet-like stream of material into a material flowing within the first passageway, the
    minor extrusion orifices alternately extending from opposite walls of the passageway for a distance somewhat less than the total width of the passageway, and the minor orifices being distributed in interdigitating relationship.

2. An apparatus comprising a cooperative combination
    a first heat-plastified thermoplastic resinous material supply,
    a second heat-plastified thermoplastic resinous material supply,
    an extrusion die so constructed and arranged so as to receive material from the first and second resinous supplies, the extrusion die comprising a
    major housing having a first passageway in full communication with the first resinous supply, a transition section defining a transition passageway, the transition passageway terminating remote from the transition section in a slot-like extrusion orifice, the transition section being so constructed and arranged so as to permit generally streamline flow of heat-plastified thermoplastic resinous materials therein,
    a plurality of minor housings each defining a slot-like extrusion orifice each of the minor housings distributed within the passageway of the major housing, each of the slot-like extrusion orifices being in generally parallel arrangement to the slot-like extrusion orifice of the transition section, each of the extrusion orifices within the first housing extending a distance substantially less than the total width of the passageway,
    a manifold so constructed and arranged so as to conduct a heat-plastified thermoplastic resinous material to the minor housings, the slots of the minor housings disposed within the major housing being in interdigitated relationship to one another and alternately extending from one side of the housing to a location generally adjacent the opposite side of the housing.

References Cited

UNITED STATES PATENTS

| | | | |
|---|---|---|---|
| 1,603,813 | 10/1926 | Stein | 18—13 X |
| 2,047,395 | 7/1936 | Stelkens | 18—12 |
| 2,249,311 | 7/1941 | Johnston et al. | 18—13 X |
| 2,803,041 | 8/1957 | Hill et al. | 18—13 X |
| 3,213,808 | 10/1965 | Schafer | 18—13 X |
| 3,274,646 | 9/1966 | Krystof | 18—13 |

WILLIAM J. STEPHENSON, *Primary Examiner.*